United States Patent Office 3,162,645
Patented Dec. 22, 1964

3,162,645
CERTAIN 3-(BICYCLO[2.2.1]HEPT-5-EN-2-YL)-
2-OXAZOLIDINONES
Carleton W. Roberts, Midland, and Daniel H. Haigh,
Beaverton, Mich., assignors to The Dow Chemical
Company, Midland, Mich., a corporation of Delaware
No Drawing. Filed Nov. 23, 1962, Ser. No. 239,805
5 Claims. (Cl. 260—307)

This invention relates to organic chemistry, and more particularly to compounds of the formula:

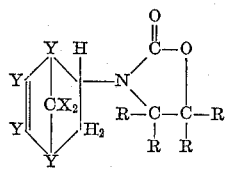

wherein X represents hydrogen or halogen of atomic weight less than 50, Y represents halogen of atomic weight of 25 to 100, and R represents hydrogen, lower alkyl or phenyl. Lower alkyl is defined as alkyl of from 1 to 4, inclusive carbon atoms.

These new compounds may be prepared by the Diels-Alder diene synthesis. The reaction may be simply carried out by causing a reaction of a cyclopentadiene compound of the formula

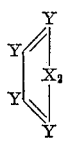

wherein X and Y have the values hereinbefore indicated, as the diene with, as dienophile, a vinyloxazolidinone compound of the formula

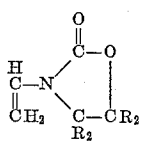

wherein R has the values stated hereinbefore, to obtain the adduct product. The reactants are consumed in equimolecular amounts and may thus be supplied to the reaction. It is advantageous but not necessary to use an inert liquid reaction medium, such as xylene, hexane, heptane, octane, nonane, petroleum ether, benzene, toluene, cumene, ethylbenzene, diethylbenzene, ethyltoluene, chlorobenzene, orthodichlorobenzene, chlorotoluene, chloroethylbenzene, chloroxylene, and the like, of which the boiling serves to control the reaction temperature. The reaction may be carried out at any temperature from about 60° C. to about 200° C., but is preferably carried out at about 100° C. to 160° C. A reaction mixture of the reactants and reaction medium, if any, may be brought together in a reaction vessel and the reactants thereafter heated to at least a temperature of incipient reaction. The reaction usually goes to completion in from about one hour to about 60 hours, with formation of desired product and minor amounts of other substances. The product can be used in a completely crude form for many of its advantageous uses. When it is desired to recover the desired compound essentially pure, the product of reaction can be purified in manners appropriate to crystalloids of high boiling point, for example, fractional crystallization.

3-vinyloxazolidinone compounds which are suitable starting materials include, for example, 3-vinyloxazolidinone, 5-methyl-3-vinyloxazolidinone, 5-ethyl-3-vinyloxazolidinone, 4-isopropyl-3-vinyloxazolidinone, 4,5-diethyloxazolidinone, 5-phenyloxazolidinone, 5-tertiarybutyl-4-methyloxazolidinone and the like.

Suitable dienes include hexachlorocyclopentadiene, 1,2,-3,4-tetrachlorocyclopentadiene, 1,2,3,4-tetrabromo-5,5-difluorocyclopentadiene, and the like.

The following examples without more will enable those skilled in the art to practice the present invention.

*Example I.*—*Preparation of 3-(1,4,5,6,7,7-Hexachlorobicyclo[2.2.1] Hept-5-En-2-Yl)-2-Oxazolidinone*

A mixture of 68 grams (0.25 mole) of hexachlorocyclopentadiene and 300 milliliters toluene was placed in a one liter, round-bottomed flask equipped with heating mantle and reflux condenser. Thereto was added, 29.1 grams (0.25 mole, corrected for purity of 96.8 percent) of vinyloxazolidinone, and the resulting mixture heated to, and maintained under gentle reflux for 20 hours to prepare the present product. The reaction mixture was cooled, filtered, and toluene solvent vaporized and removed to obtain a crude product. The solid was taken up in isopropanol, decolorized with activated charcoal, and recrystallized to obtain, in good yield, a white crystalline solid 3-(1,4,5,6,7,7-hexachlorobicyclo[2.2.1]hept-5-en-2-yl)-2-oxazolidinone product melting at 172–174° C., useful as a selective aquatic herbicide. Infrared spectrum analysis confirmed the assigned structure.

*Example II.*—*Preparation of 3-(1,4,5,6,7,7-Hexachlorobicyclo[2.2.1]Hept-5-En-2-Yl)-5-Methyl-2-Oxazolidinone*

A mixture of 68 grams (0.25 mole) of hexachlorocyclopentadiene and 250 milliliters toluene was placed in a half-liter, round-bottomed flask equipped with heating mantle, strirrer, and reflux condenser, and heated to gentle reflux temperature, about 110–115° C. Thereto, during about 30 minutes was added, dropwise and with stirring, 31.8 grams (0.25 mole) 5-methyl-3-vinyloxazolidinone. The resulting mixture was heated under reflux for 3 hours to prepare the present product. The reaction mixture was cooled and toluene solvent vaporized and removed to obtain a crude product as residue. This viscous product possesses the useful properties of the present product and can be used therefor. However, in the instant preparation it was further purified. The residue was taken up in isopropanol, decolorized, and recrystallized to obtain a white crystalline solid 3-(1,4,5,6,7,7-hexachlorobicyclo-[2.2.1]hept-5-en-2-yl) - 5-methyl-2-oxazolidinone product melting at 219–221° C., useful as a selective herbicide and for the control of trash fish. Infrared spectrum analysis confirmed the assigned structure.

*Example III.—3-(1,4,5,6,7,7-Hexachlorobicyclo[2.2.1]-Hept-5-En-2-Yl)-5-Ethyl-2-Oxazolidinone*

Procedures essentially identical with the foregoing were repeated except that as dienophile, 5-ethyl-3-vinyloxazolidin-2-one was used. The resulting pure 3-(1,4,5,6,7,7-hexachlorobicyclo[2.2.1]hept-5-en-2-yl) - 5 - ethyl-2-oxazolidinone product was a white, crystalline solid melting at 153–153.5° C. which had selective herbicidal properties. Elemental analysis gave values suitable for all the compounds of the foregoing examples and the assigned structures were confirmed by infrared spectrum analysis.

In procedures essentially identical with those of the foregoing examples, other vinyloxazolidinone compounds are caused to react with a halocyclopentadiene of the stated structure, using any or several of various hydrocarbon and substituted hydrocarbon liquids as solvent.

5-phenyl-3-vinyloxazolidinone is caused to react with hexachlorocyclopentadiene in a natural solvent mixture of dichlorobenzenes resulting from the dichlorination of benzene, to prepare a 3-(1,4,5,6,7,7-hexachlorobicyclo-[2.2.1]hept-5-en-2-yl)-5-phenyloxazolidinone as a white crystalline solid having herbicidal properties.

In similar procedures but employing 5,5-dichloro-1,2,3,4-tetrabromocyclopentadiene and vinyloxazolidinone there is obtained a 3-(1,4,5,6-tetrabromo-7,7-dichlorobicyclo [2.2.1]hept-5-en-2-yl)oxazolidinone as a white, crystalline solid. The assigned structure is confirmed by infrared analysis. The compound is herbicidal.

Employing a 4-phenyl-3-vinyloxazolidinone and 1,2,3,4-tetrachloro-5,5-difluorocyclopentadiene, there is obtained a 3-(1,4,5,6-tetrachloro-7,7-difluorobicyclo[2.2.1]-hept-5-en-2-yl)-4-phenyloxazolidinone product as a white crystalline solid.

In similar procedures other products of the present invention are readily prepared.

Illustrative of utility in the present compounds, the compound 3-(1,4,5,6,7,7-hexachloro-bicyclo-[2.2.1]hept-5-en-2-yl)-2-oxazolidinone of Example I was dispersed in water with the aid of essentially inert co-solvents and wetting agents to prepare an aqueous composition comprising the said compound. This was added to a body of water supporting a population of the common waterweed Elodea, to provide 10 parts of the present compound per million parts of total composition. On the sixteenth day thereafter the body of water was examined and all Elodea found to be dead, whereas in a check operation, the Elodea was growing vigorously.

The halogenated cyclopentadienes used herein can be prepared according to U.S. Patents 2,459,783 and 3,007,958.

The vinyloxazolidinones are prepared in known syntheses, for example

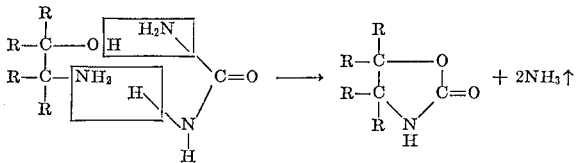

wherein R has the values hereinbefore set forth.

We claim:
1. Compound of the formula

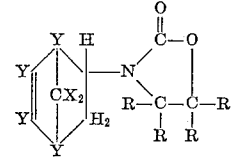

wherein Y represents a member of the group consisting of hydrogen and halogen of atomic weight less than 50, Y represents halogen of atomic weight of 25 to 100, and R represents a member of the group consisting of hydrogen, lower alkyl and phenyl, wherein lower alkyl is defined as alkyl of from 1 to 4, inclusive, carbon atoms.

2. 3 - (1,4,5,6,7,7 - hexachlorobicyclo - [2.2.1]-hept-5-en-2-yl)-2-oxazolidinone.

3. 3 - (1,4,5,6,7,7 - hexachlorobicyclo - [2.2.1]-hept-5-en-2-yl)-5-methyl-2-oxazolidinone.

4. 3 - (1,4,5,6,7,7 - hexachlorobicyclo - [2.2.1]-hept-5-en-2-yl)-5-ethyl-2-oxazolidinone.

5. 3 - (1,4,5,6,7,7 - hexachlorobicyclo - [2.2.1]-hept-5-en-2-yl)-5-phenyl-2-oxazolidinone.

No references cited.